J. P. SCANNELL.
AUTOGRAPHIC FILM CARTRIDGE AND METHOD OF USING SAME.
APPLICATION FILED FEB. 28, 1916. RENEWED APR. 10, 1920.

1,358,990. Patented Nov. 16, 1920.

WITNESSES
David G. Fee
Chas. P. Peel

INVENTOR
John P. Scannell
BY Charles D. Vihon
ATTORNEY

UNITED STATES PATENT OFFICE.

JOHN P. SCANNELL, OF CHICAGO, ILLINOIS, ASSIGNOR TO CHICAGO TITLE & TRUST COMPANY, OF CHICAGO, ILLINOIS, A CORPORATION OF ILLINOIS.

AUTOGRAPHIC FILM-CARTRIDGE AND METHOD OF USING SAME.

1,358,990.  Specification of Letters Patent.  Patented Nov. 16, 1920.

Application filed February 28, 1916, Serial No. 80,810. Renewed April 10, 1920. Serial No. 373,004.

*To all whom it may concern:*

Be it known that I, JOHN P. SCANNELL, a citizen of the United States, residing at Chicago, in the county of Cook and State of Illinois, have invented certain new and useful Improvements in Autographic Film-Cartridges and Methods of Using Same, of which the following is a specification.

This invention relates to photographic cartridges of the type capable of producing autographs or other designation marks upon a sensitized film, whereby the autographs or marks may be reproduced from the negative upon the prints with either a white field with black marks or a black field with white marks. The present invention also includes a method carried out in using the aforesaid cartridge, for the purpose of placing designation marks or characters on the film.

With the above and other objects in view, as will be apparent, this invention consists in the arrangement and construction hereinafter more fully described, claimed and illustrated in the accompanying drawings, wherein—

Figure 1:
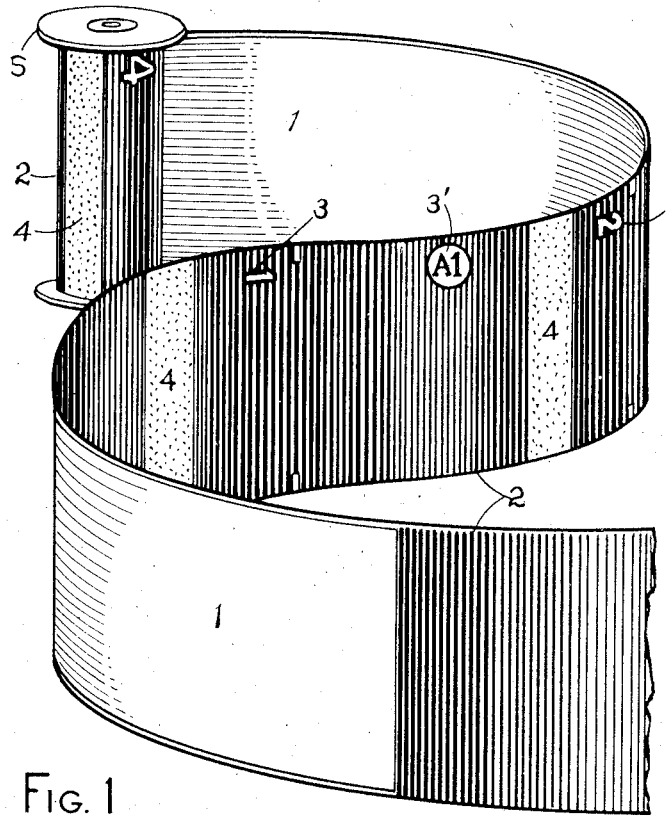
Figure 1 is a perspective view of a film cartridge with the film and its opaque paper backing partially unrolled from its carrying spool.

In carrying out the preferred form of the present invention, the usual black or opaque paper backing used in connection with film cartridges of the roll type and the film or other sensitized flexible elements are utilized as a vehicle or carrier for the purpose of producing autographs or designation marks upon the negative. The black or opaque paper backing of the sensitized film is provided at intervals with transverse strips, preferably of a color distinguishable from the color of the paper backing, upon which the autographs or designation marks are made. The nature of these strips is such that when they are exposed to light they immediately become active with light which is transmitted therefrom under certain conditions. When the film or sensitized surface is brought into proximity with these strips the activity thereof causes light to be radiated and act upon the sensitized surface or film in a manner similar to an exposure. Marks or autographs made upon the strips will be opaque or will remove portions of the strip, and in either event the light radiated by the said strips will act upon the film throughout the entire length of the strip except as to such portions thereof as have been removed or covered by the designation marks. This naturally produces a black field with clear or white characters or marks upon the negative and results in a white field with black characters or marks on the print.

Reference being had more particularly to the drawings, S and S' designate the carrying spools for the film, the spool S being that upon which the film is originally wound, and the spool S' being that upon which the film is wound after exposure. The film 1 and its opaque backing 2 are wound upon the spool in the usual manner, said backing being provided with the indicating marks 3 which appear in the usual sight opening in the camera to indicate that the film has been properly positioned for an exposure. Medially of the length of the backing 2 for each section of the film representing a single negative is an autographic strip, 4 placed upon the outer surface of the backing 2. This strip is so situated relative to each particular section of the film representing a negative that as the film 1 and its backing 2 are wound upon the spool S' after exposure, the autographic or designating strip 4 of that particular film will, during the winding operation be located adjacent to and against the sensitized surface of the film at a point commonly known as "between exposures," *i. e.* the space between the sections of the film representing two adjoining exposures.

In autographic cameras, an elongated opening is provided in the back of the camera through which the designating marks or autographs are placed upon the backing and transmitted to the film. In the present instance this same opening is used, and after the exposure has been made the spool S' is turned until the designation mark 3' for that particular exposure appears in the sight opening in the back of the camera, at which time the designating or autograph strip 4 will register with its particular opening. The autograph or designating marks may then be placed on the strip after which the continued rotation of the spool S' will bring the next indicating mark 3 into alinement with the sight opening to position the film for the next exposure.

The nature of these autographic or designating strips 4, is such that as soon as one of them is alined in register with the elongated opening, through which the autographic or designating marks are placed upon the strip, said strip will instantly become active and radiate light. After the exposure, the continued winding of the film and its backing 2 upon the spool S', will bring the strip 4 of each exposure into direct contact with the sensitized surface of the film. At this point the light radiated by the strip 4 will act upon the sensitized surface of the film, producing a black field in the negative surrounding the designating marks or autograph on the strip, said autograph or designating marks being opaque. In strips of certain types which will hereinafter be described, the making of the marks or autographs upon the strips removes the material constituting the strips and consequently no light can be radiated from the strips by such removed portions, hence the film remains unaffected by such removed portions and is affected by the remaining or undisturbed portions of the strip.

The materials utilized in making the strips upon the exterior surface of the backing 2 are many, but all of them involve two basic ingredients, to wit: any radio-responsive ray emitting substance and a base by means of which this radio-responsive ray emitting substance is attached to the backing 2. In addition to these two basic elements, it is also advisable to provide in the mixture an element which will present a roughened surface to the instrument making the autograph or designation marks upon the strip as in the case of a pencil so that clear-cut, heavy opaque marks can be made upon the strip.

By way of illustration, the following compounds may be used in making the strips 4 on the backing 2, said strips 4, being printed or painted directly thereon:

A. Paraffin or wax, phosphorescent calcium sulfid or other radio-responsive ray emitting substance.

When this compound is used the marking with a stylus or pencil removes those portions of the strip 4 marked, leaving the balance of the strip to create the black field in the negative.

B. Phosphorescent calcium sulfid or other radio-responsive ray emitting substance, gelatin, pulverized glass.

C. Phosphorescent calcium sulfid or other radio-responsive ray emitting substance, mucilage, pulverized glass.

D. Phosphorescent calcium sulfid or other radio-responsive ray emitting substance, Chinese white ink, pulverized glass.

The last three formulæ, to wit, B, C, and D, produce strips 4 on the backing 2 of a character whereby a pen or pencil produces an opaque mark or character on the strips, and hence the light radiated by the strip under the marks does not affect the sensitized surface of the film in any manner while the light from the remainder of the strip produces a black field surrounding the clear or white letters or characters in the negative.

As an alternate course, when it is desired to produce clear or white letters on a black field in the print by creating a clear or white field with black characters on the negative, the strips 4 may be formed of a base combined with a material for creating a roughened surface on the film. In this event a pencil or stylus made of a suitable base combined with phosphorescent calcium sulfid or other radio-responsive ray emitting substance may be used which will produce upon the backing 2, marks containing sufficient light to reproduce them upon the sensitized surface of the film when the film and its backing are wound upon the spool S'. With this combination the marks affect the film producing black characters surrounded by a clear or white field on the film, which are reproduced in the print by white marks surrounded by a black field.

It has been found by experience and experiments that the strips 4 can be placed upon the exterior surface of the backing 2 by approximately the same printing operation as is used in placing the designating marks 3 and 3' on the backing 2 with the exception that the materials used for the designating marks 3 and 3' are by their nature essentially different from the materials used in placing the strips 4 on the backing 2. Furthermore, it has been found that, to prevent any possible deterioration of the sensitized surface of the film by its contact with the strips 4 prior to any exposure, it is advisable to render the strips inactive or incapable of radiating light. This may be done by several methods, one of which has been found to be particularly practicable, to wit: subjecting the backing, after receiving the strips 4, to heat, which render the strips 4 inactive. The film and its backing 2 is then wound upon the spool S under the usual conditions existing in handling or packing the film itself, and as a result thereof, the strips 4 do not have further opportunity to become active until exposed through the elongated opening in the back of the camera, when their activity is restored instantly by the exposure to light.

It has also been found that after an exposure, the continued contact of the strip 4, when active with the sensitized surface of the film will not affect the film other than to reproduce the autograph or designation marks thereon and will affect only that portion of the film coinciding with said strip.

Figure 2:
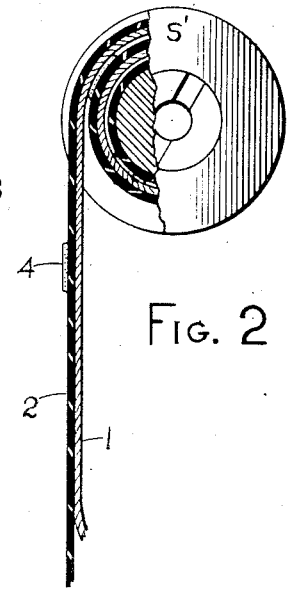
Fig. 2 is a fragmentary horizontal section through the film and the spool upon which the film is wound after being exposed.
Figure 3:
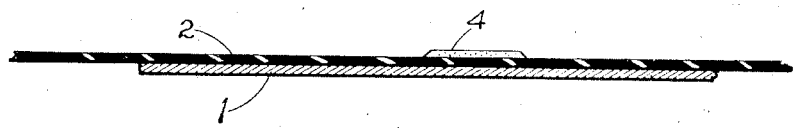
Fig. 3 is the longitudinal section through a portion of the film.
Figure 4:
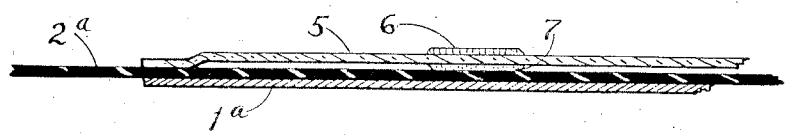
Fig. 4 is a similar view of a modified form thereof.

The modified form of the invention illustrated in Fig. 4, is essentially similar to that illustrated in Figs. 1, 2, and 3. In this form of the invention, the paper backing 2ª is provided with the radio-responsive strips 7, similar in all respects to the strips 4 of Figs. 1, 2, and 3 with the exception that they do not embody any roughening material. In addition to the paper backing 2ª, is a second transparent or translucent backing 5 of a very thin material secured to the exterior surface of the backing 2ª and wound upon the spool S therewith. Placed upon the secondary backing 5 and coinciding with the radio-responsive ray emitting strips 7 of the backing 2ª, are a series of strips 6 formed of gelatin, mucilage or wax in combination with pulverized glass or other roughened material. The autographs or designation marks are made upon these strips 6 and when the film is rolled upon the spool S' after exposure, the light radiated by the strips 7, passes through the secondary backing 5 and reproduces the autograph or designation marks upon the sensitized surface of the film. This particular form of the invention is designed to prevent the radio-responsive ray emitting strips 7 from coming in direct contact with the sensitized surface of the film, if such a combination and arrangement is found to be desirable.

It is to be noted from the foregoing that the autographs or designation marks are not reproduced upon the sensitized surface of the film at the point or time at which they are made upon the backing, but are reproduced at the point upon the film representing the space between two adjacent exposures, known as the space "between exposures" after the film has been wound on the spool S'.

As an example of other radio-responsive ray emitting or luminescent substance, zinc sulfid may be used with the same force and effect as calcium sulfid. Furthermore, there are many other substances which can be used for the purpose of carrying out the present invention with equal force and effect as these two named substances.

What is claimed is:

1. The combination with a continuous, flexible, sensitized photographic element, of an opaque cover therefor, and an actinic-ray emitting means on said cover adapted to be positioned in coöperative relation with respect to said element for affecting the sensitized surface thereof.

2. The combination with a continuous, flexible, sensitized photographic element, adapted to be rolled from one carrier to another when in use, of an opaque backing therefor adapted to be rolled with the sensitized element, and an actinic-ray emitting means carried by said backing and adapted to come into coöperative relation with said sensitized element after exposure and during the winding process to affect the same by the emitted rays.

3. The combination with a continuous, flexible, sensitized element, of a cover therefor, said cover and sensitized element adapted to be wound together after an exposure, and actinic-ray emitting means on the exterior surface of said cover adapted to have brought against it the sensitized element during the winding after an exposure for affecting the same.

4. The combination with a continuous, flexible, sensitized element, of a cover therefor, said cover and sensitized element adapted to be wound together after an exposure, and a radio-responsive ray-emitting means on the exterior of said cover adapted to come into coöperative relation with respect to the sensitized element aforesaid during the winding process.

5. The combination with a sensitized photographic element, of the usual cover therefor of opaque material, and means carried by said cover adapted to radiate rays therefrom for affecting the sensitized photographic element.

6. The combination with a sensitized photographic element, of the usual opaque cover therefor, and a radio-responsive ray-emitting element carried by said cover for affecting said photographic element.

7. The combination with a flexible, sensitized photographic film, of the usual opaque cover therefor, and radio-responsive ray-emitting material on said cover adapted to be brought into operative relation with respect to said film for affecting the same after radio-responsive action of said material.

8. The combination with a sensitized film, of a backing therefor, and ray-emitting means on said backing whereby markings may be formed and printed on said film by the rays radiating from said means.

9. The combination with a sensitized film, of a backing therefor containing marks dividing said backing into spaced sections corresponding to the exposure fields of the film, and actinic-ray emitting means positioned on each section of the backing and individual thereto for affecting the film on the space between the exposure fields thereof.

10. A film cartridge comprising a continuout sensitized film, and an opaque backing therefor, said backing carrying radio-responsive ray-emitting strips arranged to be brought into contact with the sensitized surface of the film.

11. A film cartridge comprising a continuous sensitized film, and an opaque backing therefor, said backing carrying radio-responsive ray-emitting strips for receiving markings and arranged to be brought into contact with the sensitized surface of the film after exposures to reproduce said markings on the film by the rays emitted by the surrounding portions of the strips.

12. A film cartridge comprising a sensitized photographic film, in combination with an opaque backing, said backing being provided at intervals with strips of radio-responsive ray-emitting material for the reception of marks to be reproduced on the sensitized surface of the film by radiant action of the material.

13. A film cartridge comprising a film, in combination with a backing, portions of said backing being so prepared as to emit rays to effect the sensitized surface of the film.

14. A film cartridge comprising a film, in combination with a backing, said backing including means arranged to be brought into coöperative relation with the sensitized surface of the film for reproducing on the film designation marks made on the backing.

15. A film cartridge comprising a sensitized photographic film, in combination with a backing, said backing including means for receiving marks and reproducing them upon the film in the space between sections thereof representing adjacent exposures.

16. A film cartridge comprising a sensitized photographic film, in combination with a backing, said backing including ray-emitting means for receiving marks and reproducing them on the film in the space "between exposures" by the rays emitted by said means.

17. The combination with a film, of means rolled with the film for affecting said film by actinic rays after an exposure and upon the re-rolling thereof.

18. The combination with a sensitized photographic element and its usual cover, of ray-emitting means carried by said cover to affect the sensitized surface when brought into coöperative relation therewith.

19. The herein described method of placing an inscription upon a photographically sensitized medium, which consists in forming the inscription upon the surface of a medium provided with a ray-emitting coating, the formation of the inscription removing portions of said ray-emitting coating, and placing said inscription-bearing medium in a position to affect the sensitized medium aforesaid by the rays emitted by the unremoved portions of the coating.

20. The method of placing an inscription upon a photographically sensitized medium, consisting in forming the inscription by removing portions of the coating, of a medium provided with a ray-emitting coating, and positioning the same so that the unremoved portions of the coating thereof will affect the sensitized medium by the emitted rays.

JOHN P. SCANNELL.